US007707884B2

(12) United States Patent
Simons

(10) Patent No.: US 7,707,884 B2

(45) Date of Patent: May 4, 2010

(54) APPARATUS FOR MEASUREMENT OF ABSORPTION AND DISPLACEMENT

(76) Inventor: Bryce P. Simons, P.O. Box 3027, Edgewood, NM (US) 87015

( * ) Notice: Subject to any disclaimer, the term of this patent is extended or adjusted under 35 U.S.C. 154(b) by 481 days.

(21) Appl. No.: 11/531,790

(22) Filed: Sep. 14, 2006

(65) Prior Publication Data

US 2007/0059220 A1 Mar. 15, 2007

Related U.S. Application Data

(60) Provisional application No. 60/718,174, filed on Sep. 15, 2005.

(51) Int. Cl.
*G01F 19/00* (2006.01)

(52) U.S. Cl. .......................................................... 73/427

(58) Field of Classification Search ..................... 73/38, 73/426, 427
See application file for complete search history.

(56) References Cited

U.S. PATENT DOCUMENTS

| | | | | |
|---|---|---|---|---|
| 514,426 | A * | 2/1894 | Outerbridge, Jr. | 422/102 |
| 1,399,394 | A * | 12/1921 | Mond | 73/427 |
| 1,411,990 | A * | 4/1922 | Corson | 215/380 |
| 2,742,789 | A * | 4/1956 | Seraphin | 73/427 |
| 2,823,540 | A * | 2/1958 | Patch | 73/19.08 |
| 3,867,935 | A * | 2/1975 | Eisdorfer et al. | 604/385.201 |
| 3,880,012 | A * | 4/1975 | Shapcott | 73/426 |
| 4,303,406 | A * | 12/1981 | Ross | 8/158 |
| 7,047,832 | B1 * | 5/2006 | von Meyer | 73/747 |
| 7,275,416 | B2 * | 10/2007 | Walker | 73/32 R |

* cited by examiner

*Primary Examiner*—Hezron Williams
*Assistant Examiner*—Gunnar J Gissel
(74) *Attorney, Agent, or Firm*—Deborah A. Peacock; Vidal A. Oaxaca; Peacock Myers, P.C.

(57) ABSTRACT

The present invention provides an apparatus and method for measuring the absorption and displacement of a fluid by a material. The apparatus comprises a container having graduated marks for measuring the volume, and change in volume, of a fluid (such as, but not limited to, a liquid) and a section for holding the material to be evaluated.

9 Claims, 4 Drawing Sheets

*Absorption Test Datasheet*

| | | |
|---|---|---|
| **Source of Sample:** | Placitas | |
| **Date Sampled:** | | |
| **Conventional Absorption:** | 1.50% | |
| **Conventional Bulk Specific Gravity: (SSD)** | 2.587 | |
| **Dry Weight of Sample:** | 1200.30 | |
| **Total Initial Volume of Water Added:** | 1770.0 | |
| **Total Weight of Flask, Sample and Water:** | | |
| Readings (in minutes): | | |
| 0.5 | (30 seconds) | 2228.5 |
| 5 | | 2225.5 |
| 10 | | 2225.0 |
| 30 | | 2224.0 |
| 60 | | 2223.0 |
| 120 | (2 hours) | 2222.5 |
| 240 | (4 hours) | 2222.5 |
| 1260 | (21 hours) | 2221.0 |
| Technician: | Rick Romero | |
| Date of Test: | September 13, 2005 | |
| | | |
| Initial Volume: | 2228.5 mililiters | |
| Absorption: | 0.6 % | |
| Bulk Specific Gravity (ssd) | 2.634 | |
| Bulk Specific Gravity (dry) | 2.618 | |

FIG. 2

APPARATUS FOR MEASUREMENT OF ABSORPTION AND DISPLACEMENT

CROSS-REFERENCE TO RELATED APPLICATIONS

This application is claims the benefit of, and priority to, the filing of Provisional Patent Application No. 60/718,174, entitled "Apparatus for Measurement of Absorption", filed on Sep. 15, 2005, and the specification of that application is incorporated herein by reference.

BACKGROUND OF THE INVENTION

1. Field of the Invention (Technical Field)

The present invention relates to a container and method for measuring the absorption and displacement of a fluid by a material.

2. Description of Related Art

Note that where the following discussion refers to a number of publications by author(s) and year of publication, due to recent publication dates certain publications are not to be considered as prior art vis-a-vis the present invention. Discussion of such publications herein is given for more complete background and is not to be construed as an admission that such publications are prior art for patentability determination purposes.

Various types of laboratory equipment are known comprising vessels and graduated cylinders for the measurement of fluids. For example, there exist columns with graduation marks (i.e., marked with degrees of measurement), and there are flasks with marks in the main body of the flask for approximating the volume of fluid in the flask. Also, equipment exists that is used to measure a material's amount or rate of absorption of a liquid. There are no containers or vessels, however, that are designed to measure a material's absorption and displacement of a liquid using graduated markings as a method has not been developed heretofore utilizing a vessel for such purposes. As such, there has been no teaching for a flask or other vessel suitable for carrying out the methodology described in the present invention particularly as such a vessel having a neck with graduated markings would constitute an unnecessarily expensive development unless a need for such an apparatus arose as a result of the methodology introduced herein.

Thus, there is a need for economically and accurately measuring the absorption and displacement of a fluid by a material using a vessel developed for such a purpose as described herein.

BRIEF SUMMARY OF THE INVENTION

The present invention provides a vessel having a graduated neck portion for measuring the absorption and displacement of a liquid by a material and provides a method for taking such measurements.

Thus, an embodiment of the present invention provides a vessel comprising a material holding section and an elongated neck section attached to said material holding section, said neck section comprising a plurality of graduated markings. The vessel preferably further comprises a funnel disposed on the elongated neck section. Preferably, a volume of the material holding section is greater than a volume of the elongated neck section.

In yet another embodiment, the present invention comprises a method for measuring the absorption and displacement of a fluid by a material, said method comprising providing a vessel comprising a material holding section and an elongated neck section having a plurality of graduated marking, disposing the material within the material holding section, adding the fluid to the material holding section, and measuring the change in fluid level in relation to the graduated markings to measure the absorption and displacement of the fluid by the material.

An object of the present invention is to provide an effective and efficient method for measuring the absorption and displacement of a liquid by a material. An advantage of the present invention is the design of a vessel well-suited to the design of the methodology of the present invention.

Other objects, advantages and novel features, and further scope of applicability of the present invention are set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into, and form a part of, the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 2 shows test data using the embodiment of FIG. 1;

DETAILED DESCRIPTION OF THE INVENTION

The present invention provides an apparatus and method for measuring the absorption and displacement of a fluid by a material. The apparatus comprises a container or vessel having a section for holding a material to be tested and further comprising a neck portion having graduated markings for observing and recording a change in the level of fluid held in the vessel. As used in the specification and claims herein, the terms "a", "an", and "the", mean one or more.

Thus, an embodiment of the present invention provides a container (i.e., vessel) having means for measuring the volume of a fluid (such as, but not limited to, a liquid). The measurement means comprises, but is not limed to, graduation marks (i.e., marks showing degrees of measurement). The section of the container having the graduation marks is of a sufficiently small cross-section to allow for accurate measurements. The section of the container in which the absorbing material is to be disposed may be of any dimensions, but preferably is of sufficient volume to accommodate the material to be evaluated. Therefore, as shown in the figures, an embodiment of the present invention provides for a graduated section that is of smaller cross-section than the section that holds the material. In a non-limiting example, a change in volume can be read to a precision of at least 0.1% of the volume of the sample material being tested. Preferably, the graduated calibration of neck section 104 is readable to at least 0.001 of the sample volume.

Figure 1:
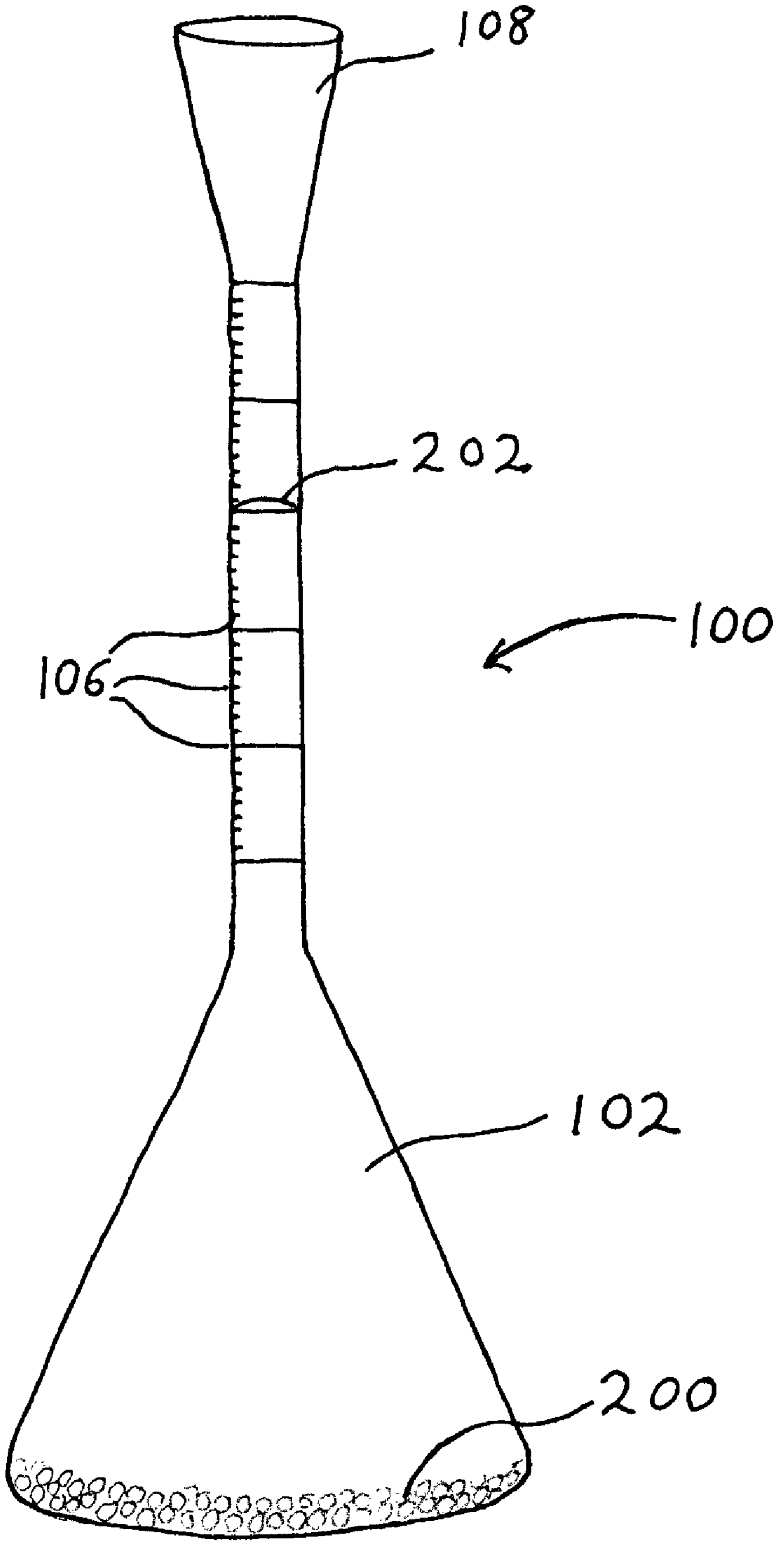
FIG. 1 is a perspective view of an embodiment of the present invention.
Figure 3:
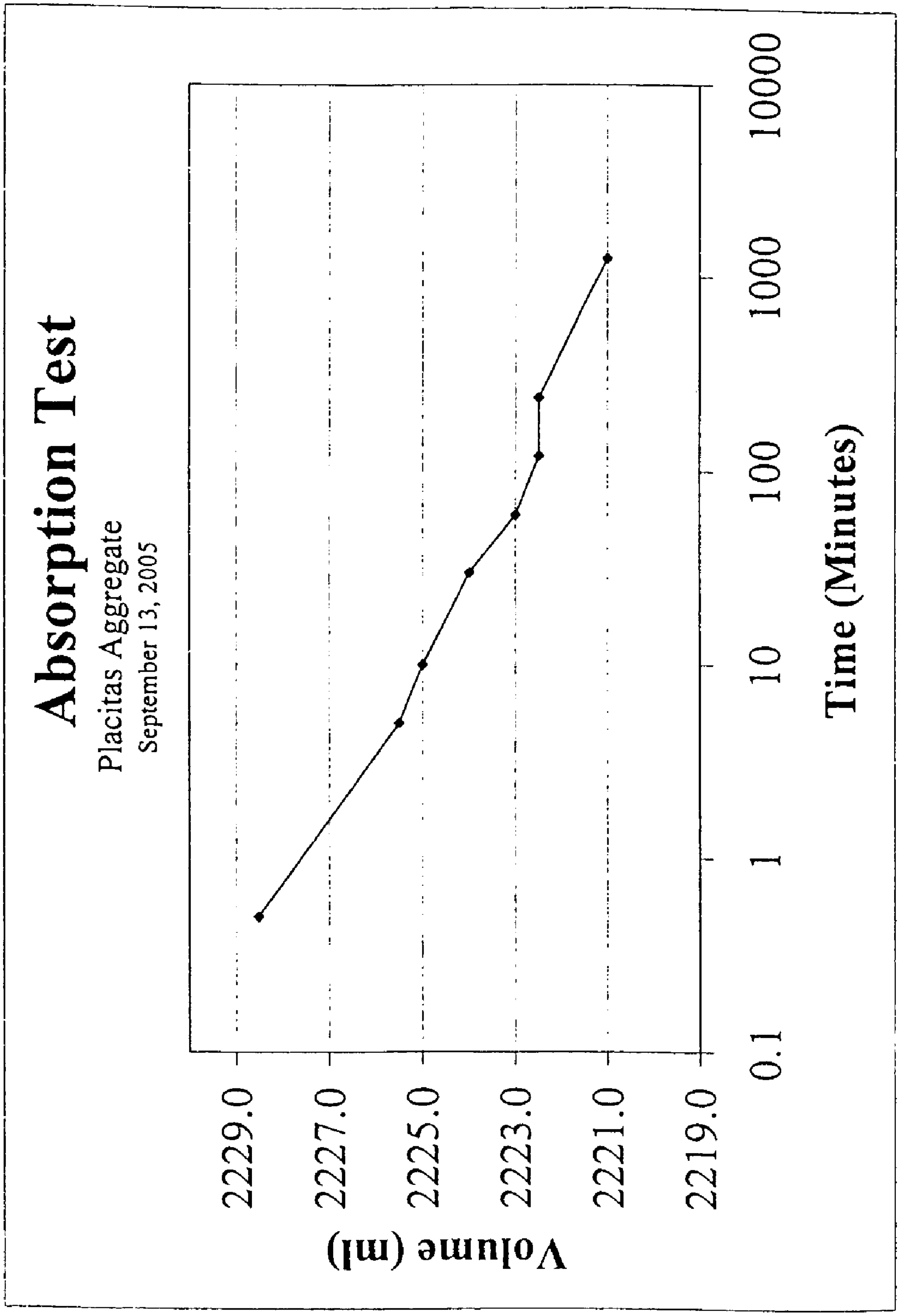
FIG. 3 shows a graph of results of absorption readings taken using the embodiment shown in FIG. 1.

Turning to the figures, FIG. 1 shows an embodiment of the invention for measuring the absorption or uptake of a liquid by a solid material. Container (i.e., vessel) 100 comprises material-holding section 102, graduated neck section 104, graduation marks 106, and funnel-shaped (inverse conical) top opening 108. In the embodiment shown, container 100 comprises a non-absorbent container that is relatively larger in its material-holding body volume (section 102) than in the extended calibrated non-absorbent neck section (section 104). In the preferred embodiment, no surface on material-holding section 102 of vessel 100 should be horizontal, near horizontal, or sloped inward in order to ensure that air impacts on an upward slope to facilitate the evacuation of air from the system.

In other embodiments, material 200 may be disposed in container 100 through any number of means such as, for example, a sealable opening (not shown) disposed at the section that holds the material. In the embodiment shown in FIG. 1, material 200 may be placed in container 100 through a through the smaller cross-section portion 104 of the container. In such an embodiment, a larger opening, such as funnel-shaped opening 108, may be disposed at an end of the graduated section opposite material-holding section 102.

In practice, a material 200 for which the absorption and displacement properties are to be studied is placed in material-holding section 102 (for example, through opening 108). A fluid 202, such as a liquid (e.g., water) is put into container 100 so that its level reaches a selected graduation mark 106. As material 200 absorbs fluid 202, the level drops, and the change in level serves to quantify the absorption of fluid 202 by material 200.

The apparatus and method of the present invention has many applications, particularly for the study of the absorption and displacement properties of soils and aggregate. The invention is useful for determining bulk dry specific gravity, apparent specific gravity, bulk saturated specific gravity on the aggregate, and the absorption.

Bulk specific gravity is the characteristic generally used for calculations of the volume occupied by the aggregate in various mixtures containing aggregate such as, but not limited to, Portland Cement concrete, hot and cold mixed asphalt, and other mixtures that are proportioned or analyzed on an absolute volume basis. Bulk dry specific gravity is also used in the computations when the aggregate is dry or assumed to be dry. Bulk saturated specific gravity is used in the computations when the aggregate is saturated or assumed to be saturated.

Apparent specific gravity pertains to the relative density of the solid material making up the constituent particles not including the pore space within the particles that is accessible to water.

Absorption values are typically used to calculate the change in the mass of an aggregate due to water absorbed in the pore spaces within the constituent particles, compared to the dry condition, when it is deemed that the aggregate has been in contact with water long enough to satisfy most of the absorption potential. A laboratory standard for absorption is that obtained after submerging dry aggregate for approximately 15 hours in water. Aggregates mined from below the water table may have a higher absorption when used, if not allowed to dry. Conversely, some aggregates when used may contain an amount of absorbed moisture less than the 15 hours soaked condition: For an aggregate that has been in contact with water and that has free moisture on the particle surfaces, the percentage of free moisture can be determined by deducting the absorption from the total moisture content determined by drying.

EXAMPLES

Example 1

An apparatus in accordance with the description provided herein is constructed and used successfully as follows:

1. A vessel as shown in FIG. 1 having a material-holding section with a cross-section greater than the cross-section of the graduated section is provided.
2. A preliminary amount of water is added to encapsulate the aggregate soil as it is added.
2. An aggregate soil material is placed in the vessel through an opening at the end opposite the material-holding section.
3. Additional water is added to a graduation line and the readings are taken of the change in level of the water.
4. The results of absorption over time are shown in FIG. 2.

Example 2

The method in accordance with the present invention is illustrated by the following non-limiting example:

1. Calibration of Vessel 1.1 The empty weight of the flask is determined, in grams;

1.2 The vessel is filled with distilled water at 70.0° F.+/−1° F. until the bottom of the meniscus is even with the "10" mark;

1.3 The filled vessel is weighed, in grams;

1.4 The empty weight of the flask is subtracted, in grams;

1.5 The 10 milliliters is subtracted to get the value back to 0;

1.6 This is the base volume of water, in milliliters.

2. Preparation of Test Specimen 2.1 Approximately two kilograms of fine aggregate or 5 kilograms of coarse aggregate is obtained from the source to be tested 2.2 The aggregate is dried in a suitable pan or vessel to constant mass at a temperature of 110+/−5° C. (230+/−9° F.). It is allowed to cool to comfortable handling temperature, without allowing it to absorb any water from the surrounding environment.

3. Test Procedure 3.1 When using normal weight aggregate, 1200+/−10 grams of oven-dry sand or 3,000 grams of oven-dry gravel to be tested is weighed out. The sample should accurately represent the material to be evaluated. If testing lightweight aggregate, the amount of material weighed out is reduced to 600+/−10 grams.

3.2 The vessel is filled with 1620 grams of water.

3.3 250 grams of distilled water is measured out, but not added;

(Note: The 1620 grams of water in 8.2 and the 200 grams of water in 8.3 is typically adjusted for the individual vessel being used. During the filling process, the combined initial volume of water and the dry soil should not be allowed to plug the neck of the vessel. Therefore, the following procedure is intended to allow sufficient water for the aggregate to become completely submerged, but to not rise into the narrow neck of the vessel. Holdback water is then added to bring the initial water level after all of the aggregate and the holdback water has been added into the calibrated portion of the neck.)

3.4 The vessel's neck is dried with a dry absorbent swab;

(Note: If the neck is not completely dry, then the finer portions of the sample may get clogged up on the water droplets, and tend to plug the neck of the flask as the sample is being poured in.)

(Note: It is preferably that an outside funnel not be used as the aggregate has a tendency to plug the smaller hole of the funnel, where it typically pours through the built-in funnel without plugging.)

3.5 The aggregate is poured into the vessel as quickly as possible, but without plugging the neck;

3.6 A timer is started immediately when the first "stone' hits the water in the vessel;

3.7 After all the sample has been poured into the vessel, of the holdback water is immediately poured in;

3.8 The vessel is not shaken, agitated or otherwise disturbed at this time.

3.9 The initial reading is taken 30 seconds after the first particle has entered the water;

3.10 The vessel is placed on a scale, and the total weight of the flask, aggregate and water is obtained;

3.11 The vessel is aggressively shaken, rolled and otherwise agitated so that all of the air is allowed to escape. Shaking and agitating of the vessel is continued until 3 minutes have elapsed.

3.12 The vessel remains undisturbed for 2 minutes;

3.13 The reading is obtained and recorded at 5 minutes;

3.14 Additional readings are obtained at 10 minutes, 30 minutes, 60 minutes, 2 hours, 4 hours, and 25+/−1 hours. Before taking each reading, the air is agitated out of the sample followed by allowing the vessel to settle for at least 2 minutes.

(Note: A all air released during the soak period should be completely eliminated from the vessel before taking the final reading. The vessel should be thoroughly and completely shaken and agitated, and then left undisturbed to allow all of the air to escape from the vessel until there is absolutely no air left in the system.)

3.15 The base reading obtained from calibrating the flask is added to each of the individual readings;

3.16 The readings are plotted on semi-log paper with the x-axis being time on the logarithmic scale.

4. Absorption

The absorption is calculated as follows:

$$\text{Absorption,percent}=[(V_i-V_{final})/W_d]\times 100$$

Where:

$V_i$=Initial Reading (The calibrated water volume at 0 plus the initial reading), ml;

$V_{final}$=Final Reading (The calibrated water volume at 0 plus the final reading), ml;

$W_d$=Original dry weight of sample, g.

5. Saturated Bulk Specific Gravity ($BSG_{ssd}$)

The Saturated Bulk Specific Gravity is calculated as follows, $$BSG_{ssd}=(W_d+W_{abs})/[V_i-V_w]$$

Where:

$W_{abs}$=Water absorbed into the sample, $(V_i-V_f)$, ml;

$W_f$=Weight of flask, g;

$V_w$=Volume of water $[W_T-(W_d+W_f)]$, ml;

$W_T$=Total weight of flask, water and sample, g;

6. Dry Bulk Specific Gravity ($BSG_d$)

The Dry Bulk Specific Gravity is calculated as follows, $$BSG_d=W_d/(V_i-V_w)$$

7. Apparent Dry Specific Gravity ($ASG_d$)

$$W_d/[(W_d+W_f+V_f)-(W_T-R_{final})]$$

Where:

$V_f$=calibrated volume of flask, ml.

$R_{final}$=Final direct reading, ml.

8. Conventional Absorption

Figure 4:
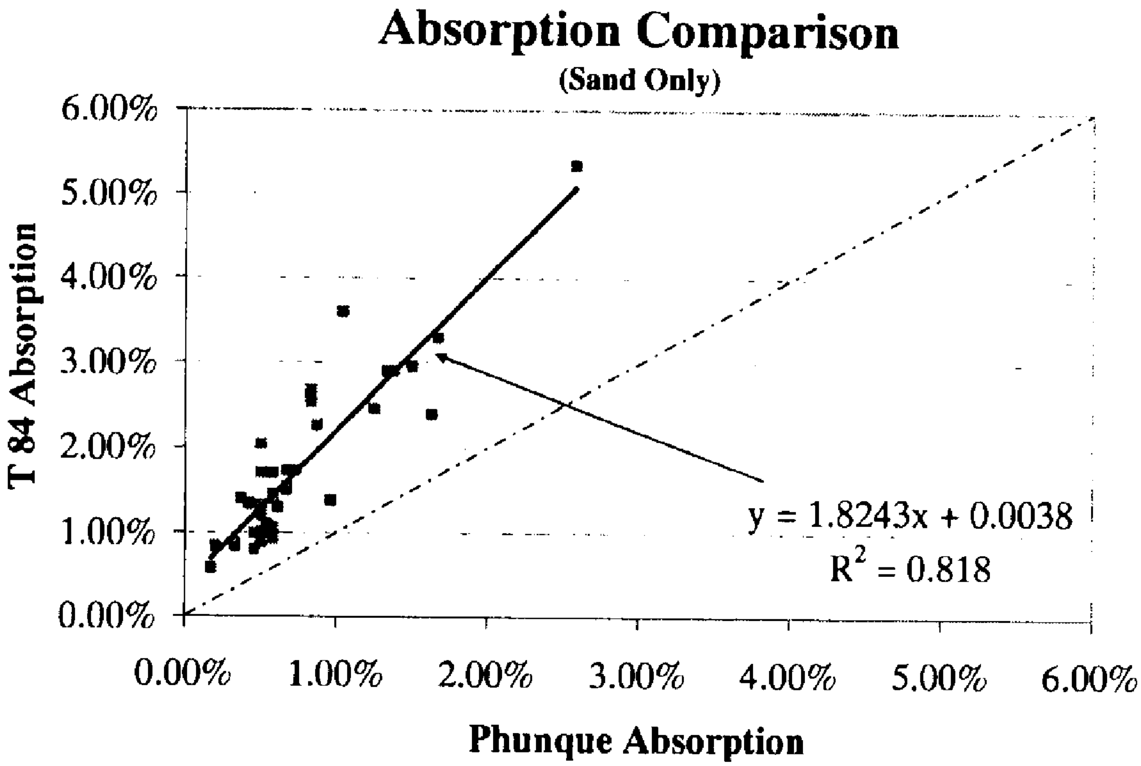
FIG. 4 shows a graph of absorption comparison for sand only.

The Correlation Equation and the graph shown in FIG. 4 is used to calculate the conventional Absorption as follows, $$\text{Conventional Absorption,percent}=[(\text{Absorption}\times 1.8243)+0.0038]\times 100.)$$

(Note: A change in data can result in different coefficients being applicable in the coefficient equation)

The preceding examples can be repeated with similar success by substituting the generically or specifically described compositions, biomaterials, devices and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for measuring the absorption and displacement of a fluid by a material, said method comprising:

providing a vessel comprising a material holding section and a constant-diameter elongated neck section having a plurality of graduated markings;

disposing the material within the material holding section;

adding the fluid to the material holding section; and measuring the change in fluid level in relation to the graduated markings to measure the absorption and displacement of the fluid by the material.

2. The method of claim 1 further comprising quantifying the absorption of the fluid.

3. The method of claim 1 wherein the fluid comprises water.

4. The method of claim 3 further comprising adding preliminary water to encapsulate the material.

5. The method of claim 1 further comprising drying the elongated constant-diameter neck section.

6. The method of claim 1 further comprising pouring the material into the vessel without plugging the elongated constant-diameter neck.

7. The method of claim 1 further comprising pouring holdback water into the vessel to bring a water level into a calibrated portion of the elongated constant-diameter neck portion.

8. The method of claim 1 further comprising agitating the vessel to remove trapped air.

9. The method of claim 1 further comprising sealing the material holding section.

* * * * *